United States Patent
Murata

(10) Patent No.: US 12,213,399 B2
(45) Date of Patent: Feb. 4, 2025

(54) WORK MAP PROVISION SERVER

(71) Applicant: Yanmar Power Technology Co., Ltd., Osaka (JP)

(72) Inventor: Sosuke Murata, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 340 days.

(21) Appl. No.: 17/598,538

(22) PCT Filed: Jan. 10, 2020

(86) PCT No.: PCT/JP2020/000606
§ 371 (c)(1),
(2) Date: Sep. 27, 2021

(87) PCT Pub. No.: WO2020/195008
PCT Pub. Date: Oct. 1, 2020

(65) Prior Publication Data
US 2022/0174863 A1    Jun. 9, 2022

(30) Foreign Application Priority Data
Mar. 28, 2019   (JP) .................... 2019-064280

(51) Int. Cl.
*A01C 21/00*  (2006.01)
*G01S 19/13*  (2010.01)
*G06Q 50/02*  (2024.01)

(52) U.S. Cl.
CPC ............ *A01C 21/005* (2013.01); *G01S 19/13* (2013.01); *G06Q 50/02* (2013.01)

(58) Field of Classification Search
CPC ........ A01C 21/005; G01S 19/13; G06Q 50/02
See application file for complete search history.

(56) References Cited

U.S. PATENT DOCUMENTS 8,412,419 B1    4/2013  Seamon et al.
11,540,437 B2 *  1/2023  Yagyu .................. A01C 17/006
(Continued)

FOREIGN PATENT DOCUMENTS

JP    2011-254711 A    12/2011
JP    2015-046007 A     3/2015
(Continued)

OTHER PUBLICATIONS

Machine translation of JP-2016076123-A (Year: 2016).*
(Continued)

*Primary Examiner* — Hussein Elchanti
*Assistant Examiner* — Kenneth M Dunne
(74) *Attorney, Agent, or Firm* — NORTON ROSE FULBRIGHT US LLP

(57) ABSTRACT

This work map provision server includes: a storage unit that has work maps stored therein which individually include work setting information of respective small regions in a farm field and attribute information of the work maps; and a map selection unit that, upon receipt of a map acquisition request from a work machine, selects, from among the work maps, one or more work maps suited to the map acquisition request on the basis of map narrowing-down information contained in the map acquisition request and/or reception time and date of the map acquisition request and also on the basis of the attribute information of the respective work maps, and then transmits the selected work maps to the work machine.

13 Claims, 5 Drawing Sheets

34B

| SCHEDULED WORK PERIOD | FARM FIELD NUMBER | FARM FIELD LOCATION INFORMATION | WORK IDENTIFICATION INFORMATION (WORK ID) | WORK NAME | FILE NAME |
|---|---|---|---|---|---|
| 2020/4/10~4/20 | 1 | 36.726455 137.726152 | W1 | BASAL FERTILIZER SPREADING | F01.task |
| 2020/4/10~4/20 | 2 | 36.746252 137.702933 | W1 | BASAL FERTILIZER SPREADING | F02.task |
| 2020/4/10~4/20 | 3 | 36.689824 137.693726 | W1 | BASAL FERTILIZER SPREADING | F03.task |
| 2020/5/15~5/25 | 2 | 36.746252 137.702933 | W2 | SIDE-ROW FERTILIZER APPLICATION | F04.task |
| 2020/5/15~5/25 | 3 | 36.689824 137.693726 | W2 | SIDE-ROW FERTILIZER APPLICATION | F05.task |
| 2020/5/15~5/25 | 4 | 36.688723 137.693726 | W2 | SIDE-ROW FERTILIZER APPLICATION | F06.task |
| 2020/5/15~5/25 | 5 | 36.726498 137.726432 | W2 | SIDE-ROW FERTILIZER APPLICATION | F07.task |
| 2020/5/15~5/25 | 6 | 36.746789 137.702872 | W2 | SIDE-ROW FERTILIZER APPLICATION | F08.task |
| 2020/7/15~7/25 | 4 | 36.688723 137.693726 | W3 | ADDITIONAL FERTILIZER APPLICATION | F09.task |
| 2020/7/15~7/25 | 6 | 36.746789 137.702872 | W3 | ADDITIONAL FERTILIZER APPLICATION | F010.task |
| 2020/7/15~7/25 | 7 | 36.686782 137.693892 | W3 | ADDITIONAL FERTILIZER APPLICATION | F011.task |

(56) References Cited

U.S. PATENT DOCUMENTS

| | | | |
|---|---|---|---|
| 2002/0040300 A1 | 4/2002 | Ell | |
| 2012/0083907 A1* | 4/2012 | Motavalli | G06Q 10/0631 |
| | | | 700/90 |
| 2013/0066666 A1* | 3/2013 | Anderson, Jr. | G06Q 10/06 |
| | | | 705/7.12 |
| 2015/0302305 A1* | 10/2015 | Rupp | A01B 79/005 |
| | | | 706/46 |
| 2018/0132422 A1* | 5/2018 | Hassanzadeh | G06Q 50/02 |
| 2019/0009905 A1* | 1/2019 | Kaechi | B64C 39/024 |
| 2019/0116725 A1* | 4/2019 | Hanya | A01C 21/007 |
| 2019/0347836 A1* | 11/2019 | Sangireddy | A01C 21/005 |

FOREIGN PATENT DOCUMENTS

| | | | | | |
|---|---|---|---|---|---|
| JP | 2016076123 A | * | 5/2016 | | G01W 1/02 |
| JP | 6049575 B2 | | 12/2016 | | |
| JP | 6280854 | | 2/2018 | | |
| JP | 6280854 B2 | | 2/2018 | | |
| JP | 2018082648 A | * | 5/2018 | | |
| JP | 2019-187377 A | | 10/2019 | | |
| JP | 2019187377 | | 10/2019 | | |
| WO | WO-2012174134 A1 | * | 12/2012 | | A01B 79/005 |
| WO | 2019/004305 A1 | | 1/2019 | | |
| WO | 2019004305 | | 1/2019 | | |

OTHER PUBLICATIONS

Machine translation JP-2018082648-A (Year: 2018).*
International Search Report dated Mar. 24, 2020 issued in corresponding PCT Application PCT/JP2020/000606.
Japanese Office Action dated Mar. 3, 2022 issued in JP Application 2019064280.
Japanese Office Action dated Oct. 3, 2023 issued in JP Application 2022128003.
European Search Report dated Mar. 3, 2022 issued in JP Application 2019064280.

* cited by examiner

| SCHEDULED WORK PERIOD | FARM FIELD NUMBER | FARM FIELD LOCATION INFORMATION | WORK IDENTIFICATION INFORMATION (WORK ID) | WORK NAME | FILE NAME |
|---|---|---|---|---|---|
| 2020/4/10~4/20 | 1 | 36.726455 137.726152 | W1 | BASAL FERTILIZER SPREADING | F01.task |
| 2020/4/10~4/20 | 2 | 36.746252 137.702933 | W1 | BASAL FERTILIZER SPREADING | F02.task |
| 2020/4/10~4/20 | 3 | 36.689824 137.693726 | W1 | BASAL FERTILIZER SPREADING | F03.task |
| 2020/5/15~5/25 | 2 | 36.746252 137.702933 | W2 | SIDE-ROW FERTILIZER APPLICATION | F04.task |
| 2020/5/15~5/25 | 3 | 36.689824 137.693726 | W2 | SIDE-ROW FERTILIZER APPLICATION | F05.task |
| 2020/5/15~5/25 | 4 | 36.688723 137.693726 | W2 | SIDE-ROW FERTILIZER APPLICATION | F06.task |
| 2020/5/15~5/25 | 5 | 36.726498 137.726432 | W2 | SIDE-ROW FERTILIZER APPLICATION | F07.task |
| 2020/5/15~5/25 | 6 | 36.746789 137.702872 | W2 | SIDE-ROW FERTILIZER APPLICATION | F08.task |
| 2020/7/15~7/25 | 4 | 36.688723 137.693726 | W3 | ADDITIONAL FERTILIZER APPLICATION | F09.task |
| 2020/7/15~7/25 | 6 | 36.746789 137.702872 | W3 | ADDITIONAL FERTILIZER APPLICATION | F010.task |
| 2020/7/15~7/25 | 7 | 36.686782 137.693892 | W3 | ADDITIONAL FERTILIZER APPLICATION | F011.task |

FIG. 4

| VEHICLE ID | WORK ID |
|---|---|
| V1 | W1 |
| V2 | W2 |
| V3 | W3 |

WORK MAP PROVISION SERVER

CROSS-REFERENCE TO RELATED APPLICATIONS

This application is a national stage application pursuant to 35 U.S.C. § 371 of International Application No. PCT/JP2020/000606, filed on Jan. 10, 2020 which claims priority under 35 U.S.C. § 119 to Japanese Patent Application No. 2019-064280 filed on Mar. 28, 2019, the disclosures of which are hereby incorporated by reference in their entireties.

TECHNICAL FIELD

The invention relates to a work map provision server.

BACKGROUND ART

Patent Literature 1 discloses a fertilizer application map generation system including a developer's terminal PC, a GIS server connected to the developer's terminal PC, and a farmer's terminal PC connected to the GIS server via the Internet.

In the fertilizer application map generation system described in Patent Literature 1, the developer's terminal PC creates a hot-water-extracted nitrogen map based on remote sensing data of a farm field and soil sampling data of the farm field. The GIS server creates a fertilizer application map by calculating the amount of fertilizer applied for each mesh in the farm field based on information such as a crop, a fertilizer name, and a fertilizer component acquired from the farmer's terminal PC, and a hot-water-extracted nitrogen map acquired from the developer's terminal PC. The fertilizer application map created by the GIS server is provided to the farmer's terminal PC by being downloaded to the farmer's terminal PC, or is provided to the farmer's terminal PC by using a storage medium such as a CD-ROM.

The fertilizer application map provided to the farmer's terminal PC is input into and stored in a memory of a PC for a variable fertilizer application, which is mounted on a tractor-type fertilizer application machine. The PC for a variable fertilizer application extracts fertilizer application amount data corresponding to a current position of the tractor-type fertilizer spreading machine and converts the extracted fertilizer application amount data into data for control. Then, a microcomputer for controlling the fertilizer application amount, which is mounted on the tractor-type fertilizer application machine, drives the fertilizer application machine based on data for control having been converted by the PC for a variable fertilizer application to carry out the fertilizer application.

CITATION LIST

Patent Literature

Patent Literature 1: Japanese Patent Laid-open Publication No. 2011-254711

DISCLOSURE OF INVENTION

Problems to be Solved by the Invention

In a system described in Patent Literature 1, when a farmer owns a number of farm fields, a number of fertilizer application maps will be created by the GIS server. Furthermore, even in a fertilizer application map for the same farm field, there is a possibility that a fertilizer application map for a basal fertilizer spreading work, a fertilizer application map for a side-row fertilizer application work, and a fertilizer application map for an additional fertilizer application work are created. It may be bothersome for the farmer to acquire the fertilizer application map to be used for the fertilizer spreading work from the GIS server.

An object of the present invention is to provide a work map provision server capable of reducing an effort required to acquire a work map.

Means for Solving the Problems

An embodiment of the present invention provides a work map provision server including: a storage unit to store a plurality of work maps, each of which is composed of work setting information for every small area in a farm field, and attribute information on each of the work maps; and a map selection unit to select one or more work maps suitable for a map acquisition request from among the plurality of work maps based on map narrowing-down information included in the map acquisition request and/or a receiving time and date of the map acquisition request as well as attribute information on each of the work maps upon receiving the map acquisition request from a work vehicle, and transmit the one or more work maps to the work vehicle.

In this configuration, since a user does not need to acquire a work map to be used for work from a server by operating a user's terminal, it results in reduction of the effort required to acquire the work map.

In one embodiment of the present invention, the attribute information on each of the work maps includes farm field location information indicating a location of the farm field for which a corresponding work map is to be used, the map narrowing-down information is vehicle position information indicating a position of the work vehicle, and the map selection unit is configured to select from among the plurality of work maps a work map to be used for a farm field being within a predetermined distance from a vehicle position indicated by the vehicle position information based on the vehicle position information and the farm field location information, and transmit the work map to the work vehicle.

In one embodiment of the present invention, the attribute information on each of the work maps includes work identification information indicating work for which a corresponding work map is to be used, the map narrowing-down information is information for work specification to specify the work, and the map selection unit is configured to select from among the plurality of work maps a work map used for the work specified by the information for work specification based on the information for work specification and the work identification information, and transmit the work map to the work vehicle.

In one embodiment of the present invention, the attribute information on each of the work maps includes scheduled work period information indicating a period of time during which a corresponding work map is to be used, and based on the receiving time and date of the map acquisition request and the scheduled work period information, the map selection unit is configured to select from among the plurality of work maps a work map for which the receiving time and date of the map acquisition request is included in the scheduled work period information, and transmit the work map to the work vehicle.

In one embodiment of the present invention, the attribute information on each of the work maps includes farm field location information indicating a location of the farm field for which a corresponding work map is to be used, work identification information indicating work for which the corresponding work map is to be used, and scheduled work period information indicating a period of time during which the corresponding work map is to be used, the map narrowing-down information consists of vehicle position information indicating a position of the work vehicle and information for work specification to specify the work, and based on the vehicle position information and the farm field location information, the map selection unit is configured to select from among the plurality of work maps as a work map candidate a work map used in the farm field being within a predetermined distance from the vehicle position indicated by the vehicle position information, select from among the selected work map candidates as a final work map candidate a work map that is used for work specified by the information for work specification and for which the receiving time and date of the map acquisition request falls within the scheduled work period, and transmit the work map to the work vehicle.

In one embodiment of the present invention, the work map is a fertilizer application map composed of target fertilizer amounts for every small area.

The foregoing or still other objects, features and effects of the present invention will be revealed by reading the following description of embodiments with reference to the accompanying drawings.

BRIEF DESCRIPTION OF DRAWINGS

FIG. 3 is a schematic diagram illustrating an example of a map attribute table.

FIG. 4 is a schematic diagram illustrating an example of a vehicle ID/work ID table.

DESCRIPTION OF EMBODIMENTS

Figure 1:
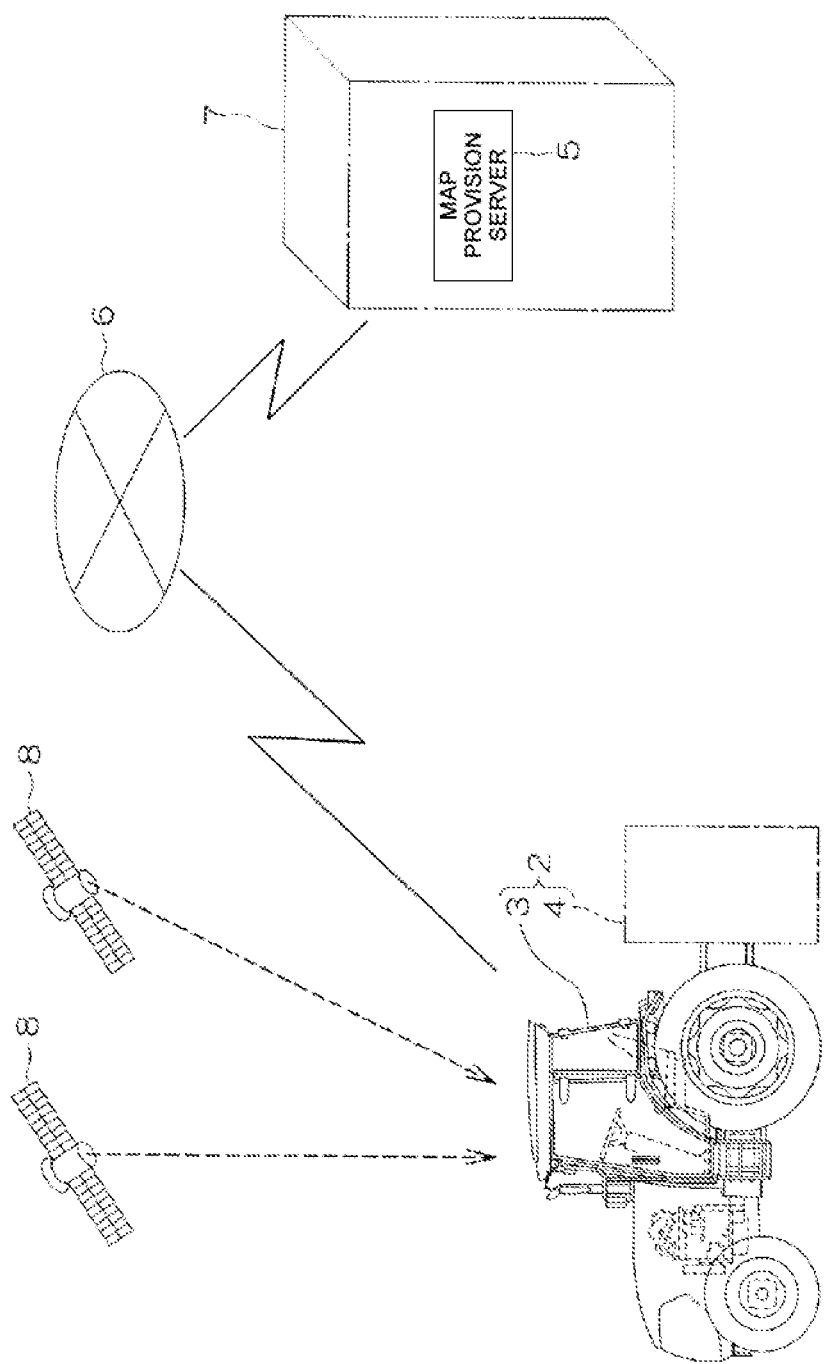
FIG. 1 is a schematic diagram illustrating a configuration of a work map provision system including a work map provision server according to an embodiment of the present invention.

FIG. 1 is a schematic diagram illustrating a configuration of a work map provision system including a work map provision server according to an embodiment of the present invention. A work map provision system 1 is a system for providing a work map to a work machine 2.

A work map provision system 1 includes the work machine 2 and a map provision server (hereinafter simply referred to as "server 5"). The work machine 2 can communicate with the server 5 via a network 6.

In the present specification, the work machine 2 includes a work vehicle, a work flying object, and the like. The work vehicle includes a work vehicle consisting of a traveling machine and the work equipment towed by the traveling machine, and a work vehicle in which the traveling machine and the work equipment are integrated. The work flying object includes a flying object such as a helicopter, a multicopter, and a drone, on which the work equipment is mounted.

FIG. 1 exemplarily illustrates the work vehicle as the work machine 2. The work vehicle illustrated in FIG. 1 as the work machine 2 consists of the traveling machine 3 and the work equipment 4 towed by the traveling machine 3. In the example shown in FIG. 1, the traveling machine 3 is a tractor. There are several types of work machines 4 such as a fertilizer spreader, an agricultural chemical spreader, a roll baler, a cultivator, a plow, a leveler, a mower, a seeding machine, a harvester, for example. As the work vehicle in which the traveling machine and the work equipment are integrated, for example, there are a rice transplanter, a combine harvester, and the like.

Either the work vehicle or the work flying object as the work machine 2 can be employed depending on the type of work. In the present embodiment, an example in which the work machine 2 is the work vehicle comprising the traveling machine 3 and the work equipment 4 towed by the traveling machine 3 is mainly described.

The work machine 2 carries a farm field out work, which is owned by a particular user. The server 5 is provided in a management center 7. The server 5 stores work maps which are used for one or more works carried out on each of farm fields owned by a plurality of users. However, for convenience of explanation, it is assumed that the server 5 stores only a work map used for one or more works out which each of farm fields owned by a particular user is carried. In the present embodiment, the work map consists of work setting information for every mesh unit in the farm field. The work map may consist of work setting information for every discrete small area instead of the every mesh unit in the farm field.

As the work setting information, there are a target fertilizer amount used in a basal fertilizer spreading work, a target fertilizer amount used in a side-row fertilizer application work, a target fertilizer amount used in an additional fertilizer application work, a target agricultural chemical spreading amount, and the like. The wording "mesh" means an individual small area in the farm field when dividing the farm field into a plurality of rectangular-shaped (in this embodiment, square) small areas.

Figure 2:
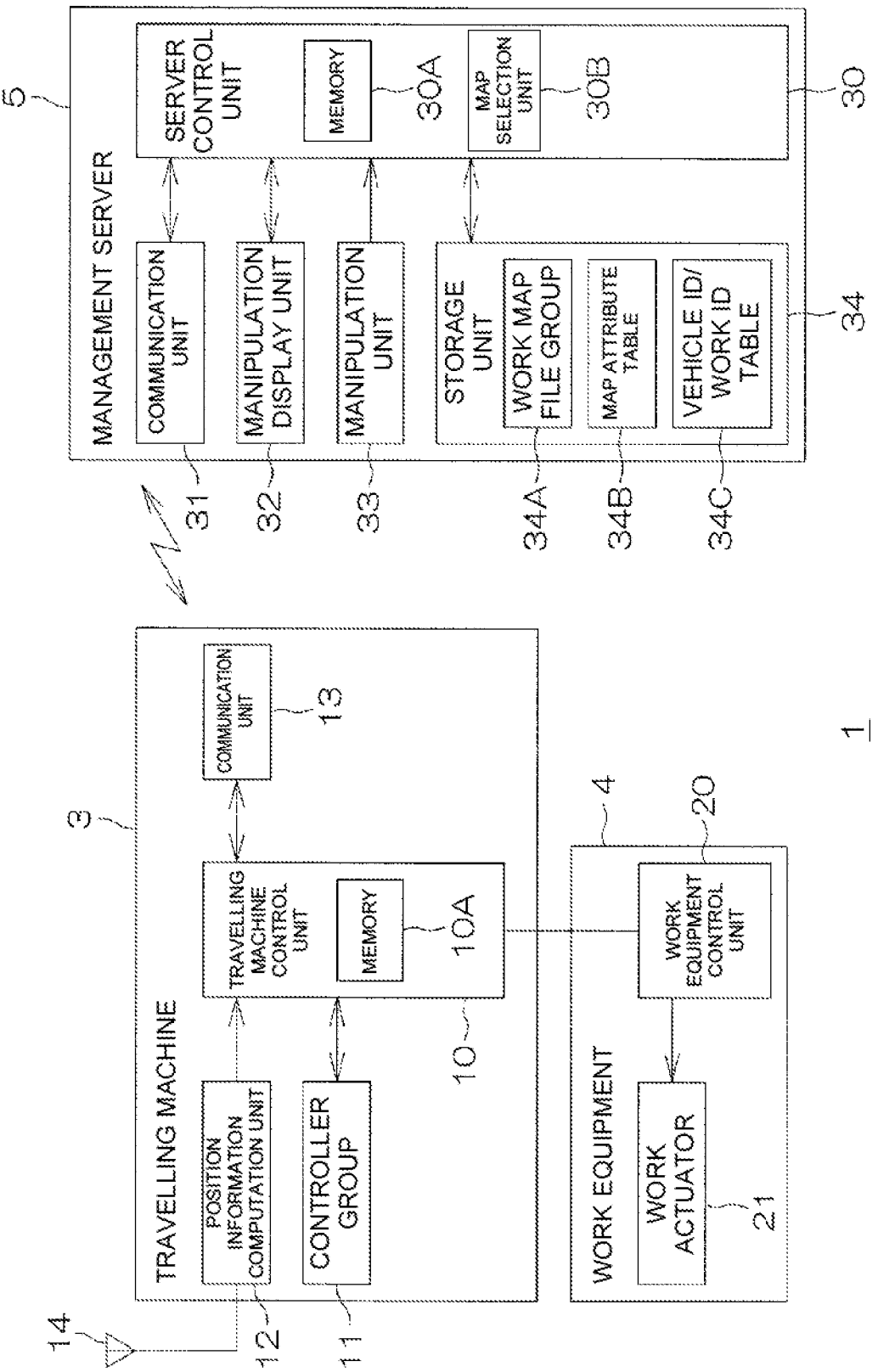
FIG. 2 is a block diagram illustrating an electrical configuration of a work vehicle, a work equipment, and a work map provision server.

FIG. 2 is a block diagram illustrating an electrical configuration of the traveling machine 3, the work equipment 4, and the server 5.

The traveling machine 3 includes a control unit (hereinafter referred to as "traveling machine control unit 10"). The traveling machine control unit 10 includes a microcomputer equipped with a CPU and a memory 10A (for example, a volatile memory, a non-volatile memory, etc.). The traveling machine control unit 10 controls an operation of the traveling machine 3 (i.e., an operation such as moving forward, moving backward, stopping, revolving, etc.). A plurality of controllers (referred to as a controller group 11) for controlling each unit of the traveling machine 3 are electrically connected to the traveling machine control unit 10. The plurality of controllers includes an engine controller to control an engine speed and the like, a vehicle speed controller to control a vehicle speed of the traveling machine 3, a steering controller to control a steering angle of front wheels of the traveling machine 3, a Power Take-Off ("PTO") shaft controller to control a rotation of a PTO shaft, etc.

Furthermore, a position information computation unit 12, a communication unit 13, and the like are connected to the traveling machine control unit 10.

A satellite signal receiving antenna 14 is electrically connected to the position information computation unit 12. The satellite signal receiving antenna 14 receives a signal from a positioning satellite 8 (see FIG. 1) which can constitute a satellite positioning system. The satellite positioning system is GNSS (Global Navigation Satellite System), for example. The position information computation unit 12 computes a position of the traveling machine 3 (precisely the position of the satellite signal receiving antenna 14) based on a positioning signal received by the satellite signal receiving antenna 14. Specifically, the position information computation unit 12 generates positioning information including time information and position information. The location information consists of latitude information and longitude information, for example.

The communication unit 13 is a communication interface through which the traveling machine control unit 10 communicates with the server 5 via the network 6.

The work equipment 4 includes a control unit (hereinafter referred to as "work equipment control unit 20") to control an operation of the work equipment 4. The work equipment control unit 20 includes a microcomputer equipped with a CPU and a memory (for example, a volatile memory, a non-volatile memory, etc.). The work equipment control unit 20 is connected to the traveling machine control unit 10 via a CAN (Controller Area Network).

A work actuator 21, etc. is connected to the work equipment control unit 20. In a case where the work equipment 4 is the fertilizer spreader, the work actuator 21 is an actuator to drive an electronic shutter provided at the bottom of a fertilizer storage tank, for example. In a case where the work equipment 4 is the agricultural chemical spreader, the work actuator 21 is an actuator to drive a pump for supplying an agricultural chemical from an agricultural chemical storage tank to a discharge nozzle, for example. In a case where the work equipment 4 is the seeding machine, the work actuator 21 is an actuator to drive a delivery device for delivering seeds from a seed storage tank, for example.

The server 5 includes a control unit (hereinafter referred to as "server control unit 30") to control the server 5. The control unit 30 includes a microcomputer equipped with a CPU and a memory 30A (for example, a volatile memory, a non-volatile memory, etc.). A communication unit 31, a manipulation display unit 32, a manipulation unit 33 and a storage unit 34 are electrically connected to the server control unit 30.

The communication unit 31 is a communication interface through which the server control unit 30 communicates with the traveling machine control unit 10 via the network 6. The manipulation display unit 32 consists of a touch panel display, for example. The manipulation unit 33 includes a keyboard, a mouse, and the like, for example.

The storage unit 34 is composed of a storage device such as a hard disk, a non-volatile memory, or the like. The storage unit 34 stores a plurality of work map files (referred to as a work map file group 34A), a map attribute table 34B, a vehicle ID/work ID table 34C, and the like.

For convenience of explanation, it is assumed that the work map file group 34A includes only a work map file (hereinafter referred to simply as "a work map") used for works out which farm fields owned by a particular user is carried. A work map for a certain farm field includes location information for specifying a location of each mesh in the farm field and work setting information on each mesh. The location information for specifying the location of the mesh consists of the location information on the four vertices of the mesh or the location information on a pair of opposite vertices among the four vertices, for example. The location information for specifying the location of the mesh may include the location information on a center of the mesh.

As shown in FIG. 3, attribute information on each work map included in the work map file group 34A is stored in the map attribute table 34B for every work map. The attribute information includes a scheduled work period, a farm field number, farm field location information, work identification information (i.e., work ID), a work name, and a file name.

The scheduled work period for a given work map is information indicating a time period during which the work map is to be used. The farm field number for a given work map is the number of a farm field for which the work map is to be used. The farm field location information on a given work map is information indicating a location of the farm field for which the work map is to be used. In the present embodiment, the farm field location information is composed of longitude and latitude information on the center position of the farm field.

The work identification information (i.e., work ID) for a given work map is information for identifying work for which the work map is to be used. The work name for a given work map is a name of work for which the work map is to be used. The file name for a given work map is a file name of the work map (i.e., the work map file).

In the example shown in FIG. 3, the particular user owns seven farm fields with farm field numbers from "1" to "7". As works carried out using the work map, there are a basal fertilizer spreading work, a side-row fertilizer application work, and an additional fertilizer application work. In the following, the works may be collectively referred to as a fertilizer application work. The work setting information (work setting information on each mesh unit) for the fertilizer application work consists of the target amount of a fertilizer to be applied per a predetermined area. Since the additional fertilizer application work is carried out with crops being grown, the work flying object equipped with the work equipment for the additional fertilizer application may be employed to carry out the additional fertilizer application work.

The work map to be used in the additional fertilizer application work is created as follows, for example. First, the crops are pictured by a multispectral camera from the sky above the farm field using the flying object such as the multicopter or the like. Next, a growth condition of the crops for every mesh is operated based on the captured images. Then, a work map including a target fertilizer application amount for each mesh is created based on the operated growth condition of the crops for every mesh. Since the growth condition of the crops changes over time, it is preferable to use the work map created based on the growth condition of the crops within a predetermined period after being created. From such a point of view, the scheduled work period for the work map used for the additional fertilizer application is set.

Figure 4:
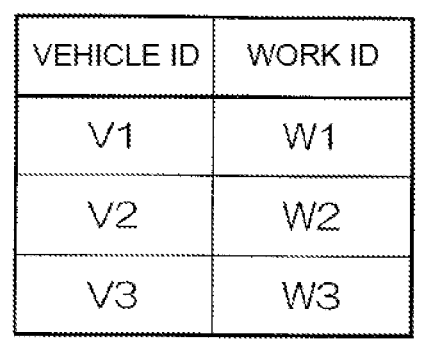

As shown in FIG. 4, the vehicle ID/work ID table 34C stores, for every vehicle ID for specifying a type of work machine 2, work identification information (i.e., work ID) for identifying work carried out by the work vehicle corresponding to the vehicle ID. As the vehicle ID, for example, both or one of a model number of the traveling machine 3 and a model number of the work equipment 4 can be used.

The server control unit 30 is provided with a map selection unit 30B as a function processing unit to select from the work map file group 34A one or more work maps suitable for a map acquisition request command and transmit them to the work machine 2 in response to the map acquisition request command transmitted from the work machine 2.

Figure 5:
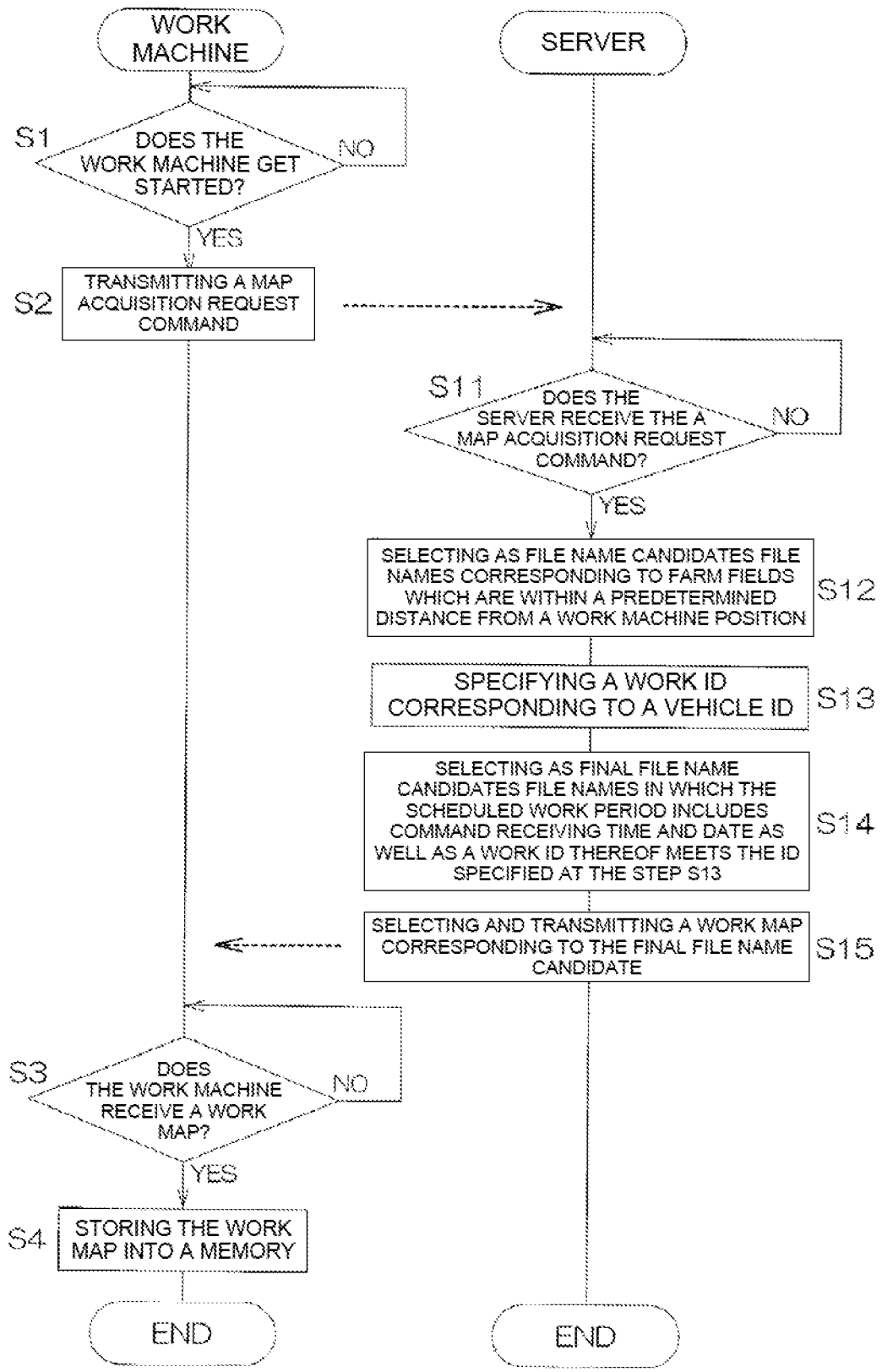
FIG. 5 is a flowchart for explaining operations of a traveling machine control unit and a map selection unit in a server control unit when a work vehicle acquires a work map from a work map provision server.

FIG. 5 is a flowchart for explaining operations of the traveling machine control unit 10 and the map selection unit 30B in the server control unit 30 when the work machine 2 acquires the work map from the server 5.

Upon the work machine 2 is started up (step S1), the traveling machine control unit 10 transmits to the server 5 a map acquisition request command including map narrowing-down information consisting of positioning information (vehicle position information and time information) generated by the position information computation unit 12 and a vehicle ID of the work machine 2 (step S2). The meaning of "the work machine 2 is started" is that an engine of the traveling machine 3 is driven, for example. When the traveling machine 3 starts traveling after having been stopped for a predetermined or more time, it may be determined that the work machine 2 is started. The vehicle ID is an example of "information for work specification" of the present invention.

Upon the map selection unit 30B in the server control unit 30 receives the map acquisition request command transmitted from the work machine 2 (i.e., "YES" in the step S11), the operation goes to the step S12.

In the step S12, the map selection unit 30B selects as file name candidates file names corresponding to farm fields which are within a predetermined distance from a position of the work machine 2 from among the file names in the map attribute table 34B based on the vehicle position information included in the received map narrowing-down information and the farm field location information in the map attribute table 34B (step S12).

Specifically, the map selection unit 30B selects as file name candidates one or more file names for the farm fields whose center positions are within a predetermined distance from the work vehicle position indicated by the vehicle position information. The predetermined distance is set to 500 m, for example.

In addition, the map selection unit 30B specifies a work ID corresponding to the vehicle ID based on the vehicle ID/work ID table 34C and the vehicle ID included in the map acquisition request command (step S13).

Next, the map selection unit 30B selects from among the file name candidates selected in the step S12 as final file name candidates file names for which the scheduled work period includes a receiving time and date of the map acquisition request command as well as a work ID thereof meets the work ID specified at the step S13 (step S14).

The time information included in the received positioning information may be used instead of the receiving time and date of the map acquisition request command. In other words, the time information included in the received positioning information may be deemed as the receiving time and date of the map acquisition request command.

Then, the map selection unit 30B selects from among the work maps included in the work map file group 34A one or more work maps corresponding to the final file name candidate selected in step S14, and transmits them to the work machine 2 (step S15).

Upon the traveling machine control unit 10 receives one or more work maps transmitted from the server 5 ("YES" in the step S3), it stores the received work maps in the memory 10A (step S4).

After this, upon the work machine 2 starts working, the traveling machine control unit 10 acquires, from the work map stored in the memory 10A in the step S4 at a predetermined time interval, the work setting information (e.g., the target fertilizer application amount) corresponding to the position information computed by the position information computation unit 12, and provides the work equipment control unit 20 with the work setting information. The work equipment control unit 20 controls the work actuator 21 based on the work setting information (e.g., the target fertilizer application amount) provided by the traveling machine control unit 10. Thereby, a fertilizer application amount per unit area for the mesh to be worked is controlled so as to be the target fertilizer application amount corresponding to the mesh in the work map.

In the aforementioned embodiment, since the specific user does not need to acquire the work map to be used for the work from the server 5 by operating the user's terminal, it results in reduction of the effort required to acquire the work map.

Although the embodiment of the invention has been described, the present invention may have other embodiments. For example, in the above mentioned embodiment, although the traveling machine control unit 10 transmits to the server 5 as information for work specification the vehicle ID for specifying a type of the work machine 2 (see step S2 shown in FIG. 5), work identification information (work ID) may be transmitted as information for work specification. As a result, the server control unit 30 does not need to acquire the work ID corresponding to the vehicle ID from the vehicle ID/work ID table 34C.

Furthermore, in the above mentioned embodiment, the traveling machine control unit 10 transmits to the server 5 the map acquisition request command including the map narrowing-down information consisting of the positioning information and the vehicle ID upon the work machine 2 is started (see step S2 shown in FIG. 5).

However, the traveling machine control unit 10 may transmit to the server 5 the map acquisition request command including as the map narrowing-down information only the vehicle position information indicating the position information on the work machine 2 when the work machine 2 is started. In this case, the map selection unit 30B selects the work map corresponding to one or more file names for the farm fields whose center positions are within a predetermined distance from the position of the work machine 2 indicated by the vehicle position information, and transmits the work map to the work machine 2.

Furthermore, in this case, the map selection unit 30B may select the work map in the following manner. That is, the map selection unit 30B selects as file name candidates one or more file names for the farm fields whose center positions are within a predetermined distance from the position of the work machine 2 indicated by the vehicle position information. Next, the map selection unit 30B selects from among the file name candidates the work map corresponding to the file names for which a receiving time of the map acquisition request command is included in the scheduled work period, and transmits the work map to the work machine 2.

Furthermore, the traveling machine control unit 10 may transmit to the server 5 the map acquisition request command including as the map narrowing-down information only the vehicle ID when the work machine 2 is started. In this case, the map selection unit 30B acquires the work ID corresponding to the vehicle ID from the vehicle ID/work ID table 34C, selects the work map corresponding to one or more file names suited to the acquired work ID, and transmits the work map to the work machine 2.

Furthermore, in this case, the map selection unit 30B may select the work map in the following manner. That is, the map selection unit 30B acquires the work ID corresponding to the vehicle ID from the vehicle ID/work ID table 34C. Then, the server control unit 30 selects the work map corresponding to the file names which is suited to the acquired work ID and for which the receiving time of the map acquisition request command is included in the scheduled work period, and transmits the work map to the work machine 2.

Furthermore, the traveling machine control unit 10 may simply transmit only a map acquisition request command to the server 5 when the work machine 2 is started. In this case, the server control unit 30 selects the work map corresponding to the file names for which the receiving time of the map acquisition request command is included in the scheduled work period, and transmits the work map to the work machine 2.

Furthermore, in the above mentioned description of embodiments, although it is assumed that the traveling machine control unit 10 acquires the work map from the server 5 on a work carrying out day, the traveling machine control unit 10 may acquire the work map from the server 5 prior to the scheduled work carrying out day. In this case, the traveling machine control unit 10 may transmit to the server 5 the map acquisition request command including at least a scheduled work time and date (or a scheduled work date) as the map narrowing-down information. In this case, the server 5 selects as selection candidates the work map corresponding to the file names in which the scheduled work time and date included in the map narrowing-down information falls within the scheduled work period. Unless the map narrowing-down information include any narrowing-down information other than the scheduled work time and date, the server 5 transmits the selection candidates to the work machine 2.

On the other hand, if the map narrowing-down information includes narrowing-down information other than the scheduled work time and date, the server 5 selects from among the selection candidates suited to the narrowing-down information other than the scheduled work time and date, and transmits the selection candidates to the work machine 2.

In addition, in the above described embodiments, it is described that the work, which is carried out by using the work map, includes the basal fertilizer spreading work, the side-row fertilizer application work, and the additional fertilizer application work. However, the work, which is carried out by using the work map, may be work other than fertilizer application work, such as the agricultural chemical spreading work, the seeding work, and the like.

The work map used for the agricultural chemical spreading work is an agricultural chemical spread amount map consisting of a target agricultural chemical spread amount for every mesh. The work map used for the seeding work is a seeding amount map consisting of a target seeding amount for every mesh.

Although some embodiments of the present invention have been described in detail, these are merely examples used to clarify the technical content of the present invention, and the present invention should not be construed as limited to these examples, the scope of the present invention should be limited only by the scope of the claims attached.

This application corresponds to Japanese Patent Application No. 2019-64280 filed with the Japan Patent Office on Mar. 28, 2019, the entire disclosure of which application is hereby incorporated by reference.

DESCRIPTION OF REFERENCE NUMERALS

1 Work Map Provision System
2 Work machine
3 Traveling machine
4 Work equipment
5 Management Server
6 Network
8 Positioning satellite (GNSS satellite)
10 Work vehicle control unit
10A Memory
11 Controller group
12 Position information computation unit
13 Communication unit
14 Satellite signal receiving antenna
20 Work equipment control unit
21 Work actuator
30 Control unit
30A Memory
30B Map selection unit
31 Communication unit
32 Manipulation display unit
33 Manipulation unit
34 Storage unit
34A Work map file group
34B Work map table
34C Vehicle ID/work ID table

The invention claimed is:

1. A work map provision server comprising:
a memory configured to store first processor-executable code, a plurality of fertilizer application maps, and respective attribute information for each fertilizer application map of the plurality of fertilizer application maps, wherein:
the respective attribute information for each of the fertilizer application maps includes work identification information indicating work for which a corresponding fertilizer application map is to be used, and
each fertilizer application map of the plurality of fertilizer application maps is composed of second processor-executable code that, when executed by a processor of a work vehicle, controls the work vehicle to apply a target amount of fertilizer to each respective area of a plurality of areas in a farm field; and
a processor in communication with the memory, the processor configured to execute the first processor-executable code to:
receive a map acquisition request, the map acquisition request including map narrowing-down information that includes information specifying work to be performed,
select a fertilizer application map, from among the plurality of fertilizer application maps, that is indicated to be used for the specified work in the map acquisition request based on the information specifying work to be performed and the respective work identification information for each fertilizer application map, and
transmit the fertilizer application map for use by the work vehicle.

2. The work map provision server according to claim 1, wherein:
the respective attribute information for each of the fertilizer application maps includes farm field location information indicating a location of the farm field for which a corresponding work map is to be used,
the map narrowing-down information is vehicle position information indicating a position of the work vehicle, and
the processor is configured to:
select, from among the plurality of fertilizer application maps, a fertilizer application map to be used for a farm field that is within a predetermined distance from the position of the work vehicle based on the vehicle position information and the farm field location information, and transmit the fertilizer application map for use by the work vehicle.

3. The work map provision server according to claim 1, wherein each fertilizer application map of the plurality of fertilizer application maps includes a basal fertilizer map and an additional fertilizer map.

4. The work map provision server according to claim 3, wherein the basal fertilizer map includes a target amount of fertilizer for application to each respective area of a plurality of areas in a farm field prior to sowing or planting, and wherein the additional fertilizer map includes a target amount of fertilizer for application to each respective area of the plurality of areas in a farm field subsequent to sowing or planting.

5. The work map provision server according to claim 3, wherein the additional fertilizer map is determined based on an aerial image of at least a portion of the farm field.

6. The work map provision server according to claim 1, wherein the map acquisition request is received from a source external to, and in wireless communication with, the work map provision server.

7. The work map provision server according to claim 6, wherein the source is a work vehicle.

8. The work map provision server according to claim 1, wherein the one or more fertilizer application maps are transmitted to the work vehicle.

9. The work map provision server according to claim 1, wherein the second processor-executable code causes the work vehicle to apply a first target amount of fertilizer to a first area of the farm field and a second target amount of fertilizer, that is different than the first target amount, to a second area of the farm field.

10. A work map provision server comprising:
a memory configured to store first processor-executable code, a plurality of fertilizer application maps, and respective attribute information for each fertilizer application map of the plurality of fertilizer application maps, wherein:
the respective attribute information for each of the fertilizer application maps includes scheduled work period information indicating a period of time during which a corresponding fertilizer application map is to be used and work identification information indicating work for which the corresponding fertilizer application map is to be used, and
each fertilizer application map of the plurality of fertilizer maps is composed of second processor-executable code that, when executed by a processor of a work vehicle, controls the work vehicle to apply a target amount of fertilizer to each respective area of a plurality of areas in a farm field; and
a processor in communication with the memory, the processor configured to execute the first processor-executable code to:
receive a map acquisition request at a receiving time and date, the map acquisition request including map narrowing-down information that includes information specifying work to be performed,
select, from among the plurality of fertilizer application maps, a fertilizer application map based on scheduled work period information of the fertilizer application map indicating a period of time that includes the receiving time and date of the map acquisition request, and on the work identification information of the fertilizer application map indicating work that includes the work to be performed of the map acquisition request, and
transmit the fertilizer application map for use by the work vehicle.

11. The work map provision server according to claim 10, wherein the second processor-executable code causes the work vehicle to apply a first target amount of fertilizer to a first area of the farm field and a second target amount of fertilizer, that is different than the first target amount, to a second area of the farm field.

12. A work map provision server comprising:
a memory configured to store first processor-executable code, a plurality of fertilizer application maps, and respective attribute information for each fertilizer application map of the plurality of fertilizer application maps, wherein:
the respective attribute information for each of the fertilizer application maps includes farm field location information indicating a location of the farm field for which a corresponding fertilizer application map is to be used, work identification information indicating work for which the corresponding fertilizer application map is to be used, and scheduled work period information indicating a period of time during which the corresponding fertilizer application map is to be used, and
each fertilizer application map of the plurality of fertilizer maps is composed of second processor-executable code that, when executed by a processor of a work vehicle, controls the work vehicle to apply a target amount of fertilizer to each respective area of a plurality of areas in a farm field; and
a processor in communication with the memory, the processor configured to execute the first processor-executable code to:
receive a map acquisition request at a receiving time and date, the map acquisition request including map narrowing-down information that consists of vehicle position information indicating a position of a work vehicle and information for work specification to specify the work,
select one or more fertilizer application maps, from among the plurality of fertilizer application maps, as fertilizer application map candidates, wherein the one or more fertilizer application maps are indicated by farm field location information to be used in a farm field that is within a predetermined distance from the vehicle position indicated by the vehicle position information,
select a final work map candidate from among the selected fertilizer application map candidates, wherein the final fertilizer application map candidate is indicated by work identification information to be used for work specified by the information for work specification of the map acquisition request and is indicated by scheduled work period information to be used for a period of time that includes the receiving time and date of the map acquisition request; and
transmit the final fertilizer application map candidate for use by the work vehicle.

13. The work map provision server according to claim 12, wherein the second processor-executable code causes the work vehicle to apply a first target amount of fertilizer to a first area of the farm field and a second target amount of fertilizer, that is different than the first target amount, to a second area of the farm field.

* * * * *